(12) United States Patent
Kawase

(10) Patent No.: US 10,594,199 B2
(45) Date of Patent: Mar. 17, 2020

(54) ACTUATOR HAVING HEAT RADIATION MEMBER

(71) Applicant: Azbil Corporation, Chiyoda-ku (JP)

(72) Inventor: Shigeru Kawase, Chiyoda-ku (JP)

(73) Assignee: Azbil Corporation, Chiyoda-ku (JP)

(*) Notice: Subject to any disclaimer, the term of this patent is extended or adjusted under 35 U.S.C. 154(b) by 280 days.

(21) Appl. No.: 15/522,663

(22) PCT Filed: Oct. 9, 2015

(86) PCT No.: PCT/JP2015/078782
§ 371 (c)(1),
(2) Date: Apr. 27, 2017

(87) PCT Pub. No.: WO2016/067902
PCT Pub. Date: May 6, 2016

(65) Prior Publication Data
US 2017/0338727 A1 Nov. 23, 2017

(30) Foreign Application Priority Data

Oct. 28, 2014 (JP) .................................. 2014-219525

(51) Int. Cl.
*H02K 41/035* (2006.01)
*H02K 41/03* (2006.01)
(Continued)

(52) U.S. Cl.
CPC ............. *H02K 41/035* (2013.01); *H02K 1/06* (2013.01); *H02K 3/28* (2013.01); *H02K 41/031* (2013.01);
(Continued)

(58) Field of Classification Search
CPC ............ H02K 1/06; H02K 3/28; H02K 33/00; H02K 33/02; H02K 33/16; H02K 5/04;
(Continued)

(56) References Cited

U.S. PATENT DOCUMENTS 6,326,706 B1 * 12/2001 Zhang ................... F04B 35/045
310/12.24
7,540,164 B2 * 6/2009 Roche ................... A47F 3/0443
62/246
(Continued)

FOREIGN PATENT DOCUMENTS

| CN | 103560639 A | 2/2014 |
|---|---|---|
| JP | 2004-328889 A | 11/2004 |
| JP | 3683199 B2 | 8/2005 |
| JP | 2009-136118 A | 6/2009 |
| JP | 2009-290991 A | 12/2009 |

OTHER PUBLICATIONS

International Search Report dated Dec. 28, 2015 in PCT/JP2015/078782 filed Oct. 9, 2015.

*Primary Examiner* — Jermele M Hollington
*Assistant Examiner* — Rashad H Johnson
(74) *Attorney, Agent, or Firm* — Oblon, McClelland, Maier & Neustadt, L.L.P.

(57) ABSTRACT

An actuator (202) includes a stick-shaped center yoke (1) inserted through a cylindrical outer yoke (10), a support member that supports the outer yoke (10) such that the outer yoke (10) is linearly movable in an axial direction of the center yoke (1), a first coil (2), a second coil (3), and a third coil (4) wound around the center yoke (1), a first magnet array (11) and a second magnet array (12) disposed on an inner periphery of the outer yoke (10) in such a manner as to face the first coil (2), the second coil (3), and the third coil (4), a flat base plate (13) disposed at a first end portion of the center yoke (1), and a heat radiation member touching the base plate (13).

11 Claims, 10 Drawing Sheets

(51) Int. Cl.
*H02K 1/06* (2006.01)
*H02K 3/28* (2006.01)
*H02K 9/22* (2006.01)
*H02K 5/18* (2006.01)
*H02K 7/106* (2006.01)

(52) U.S. Cl.
CPC ............... *H02K 5/18* (2013.01); *H02K 7/106* (2013.01); *H02K 9/22* (2013.01)

(58) Field of Classification Search
CPC ............ H02K 5/18; H02K 5/24; H02K 7/106; H02K 9/22; H02K 41/031; H02K 41/035
USPC ............ 310/15, 16, 25, 28, 36, 37, 51
See application file for complete search history.

(56) References Cited

U.S. PATENT DOCUMENTS

| | | | |
|---|---|---|---|
| 8,615,976 B1* | 12/2013 | Hauser | H02K 7/1025 310/89 |
| 2013/0169071 A1* | 7/2013 | Endo | H02K 33/02 310/25 |
| 2013/0181548 A1* | 7/2013 | Kakiuchi | H02K 9/19 310/12.29 |
| 2013/0241322 A1* | 9/2013 | Lee | B06B 1/045 310/25 |
| 2018/0115232 A1* | 4/2018 | Kawase | H02K 41/0356 |
| 2019/0267880 A1* | 8/2019 | Ichihashi | G03B 5/00 |

* cited by examiner (a)

(b)

(a)

(b)

ACTUATOR HAVING HEAT RADIATION MEMBER

TECHNICAL FIELD

The present invention relates to an actuator, particularly to a linear actuator attached to, for example, a robot that assembles components.

BACKGROUND ART

To date, robots have performed a variety of works involving an assembly of components using an end effector attached to its far end. As an example of an actuator that drives an end effector, a linear actuator in which a movable portion is linearly movable relative to a fixed portion is used in some cases.

Examples of the linear actuator include a "direct drive actuator", which directly drives a movable portion without using a decelerator.

A direct drive actuator is capable of controlling operations at high speed and with high precision and enhancing its work range when linked with a robot. On the other hand, a direct drive actuator has problems in size reduction and high power output. Moreover, objects attachable to the far end of a robot are limited to those within a specific weight range. Thus, actuators having a small size and high power output and producing a small amount of heat have been desired.

Direct drive actuators include a voice coil motor (VCM), in which only a coil reciprocates in a strong magnetic field produced by a permanent magnet, such as a neodymium magnet. A voice coil motor can be designed to have a light-weight movable portion, but is more likely to have low power output per volume and produce heat since the voice coil motor is a direct drive motor. Moreover, an end effector, such as a hand, attached to the movable portion is more likely to be heated to high temperatures as a result of heat being directly transferred to the end effector.

On the other hand, a voice coil motor disclosed in PTL 1 includes a stator having an air injection mechanism. The properties of the voice coil motor are enhanced by cooling an armature coil with air without changing the size of the motor.

A linear motor disclosed in PTL 2 includes multiple voice coil linear motor units arranged in parallel. The linear motor having this structure is designed to have high power output while restricting the volume increase and thermally separates the movable portion and the fixed portion from each other.

CITATION LIST

Patent Literature

PTL 1: Japanese Unexamined Patent Application Publication No. 2004-328889
PTL 2: Japanese Patent No. 3683199

SUMMARY OF INVENTION

Technical Problem

The voice coil motor disclosed in PTL 1 has a structure that cools the armature coil but does not disclose a structure that radiates produced heat.

In addition, directly cooling the armature coil disposed at the movable portion with air affects the thrust force of the movable portion.

The linear motor disclosed in PTL 2 includes two inner yokes arranged in parallel and adjoining outer yokes, which form a main magnetic path. This linear motor thus has a width twice the width of a linear motor including one inner yoke. Furthermore, this linear motor has a structure in which two inner yokes are housed in a fixing base having a closed-end box shape and the outer yokes are linearly movably supported by a slider at an opening of the fixing base (this structure is called an "outer bearing structure"). This structure does not fully reduce the size of the linear motor.

The present invention has been made to solve the above-described problems and aims to provide a highly efficient small actuator that restricts the temperature rise.

Solution to Problem

An actuator in the present invention includes a stick-shaped inner yoke inserted through a cylindrical outer yoke, a support member that supports the outer yoke such that the outer yoke is linearly movable in an axial direction of the inner yoke, a coil wound around the inner yoke, a magnet disposed on an inner periphery of the outer yoke in such a manner as to face the coil, a flat base plate disposed at a first end portion of the inner yoke, and a heat radiation member touching the base plate.

Advantageous Effects of Invention

The present invention can obtain a highly efficient small actuator that restricts the temperature rise.

DESCRIPTION OF EMBODIMENTS

Figure 1:
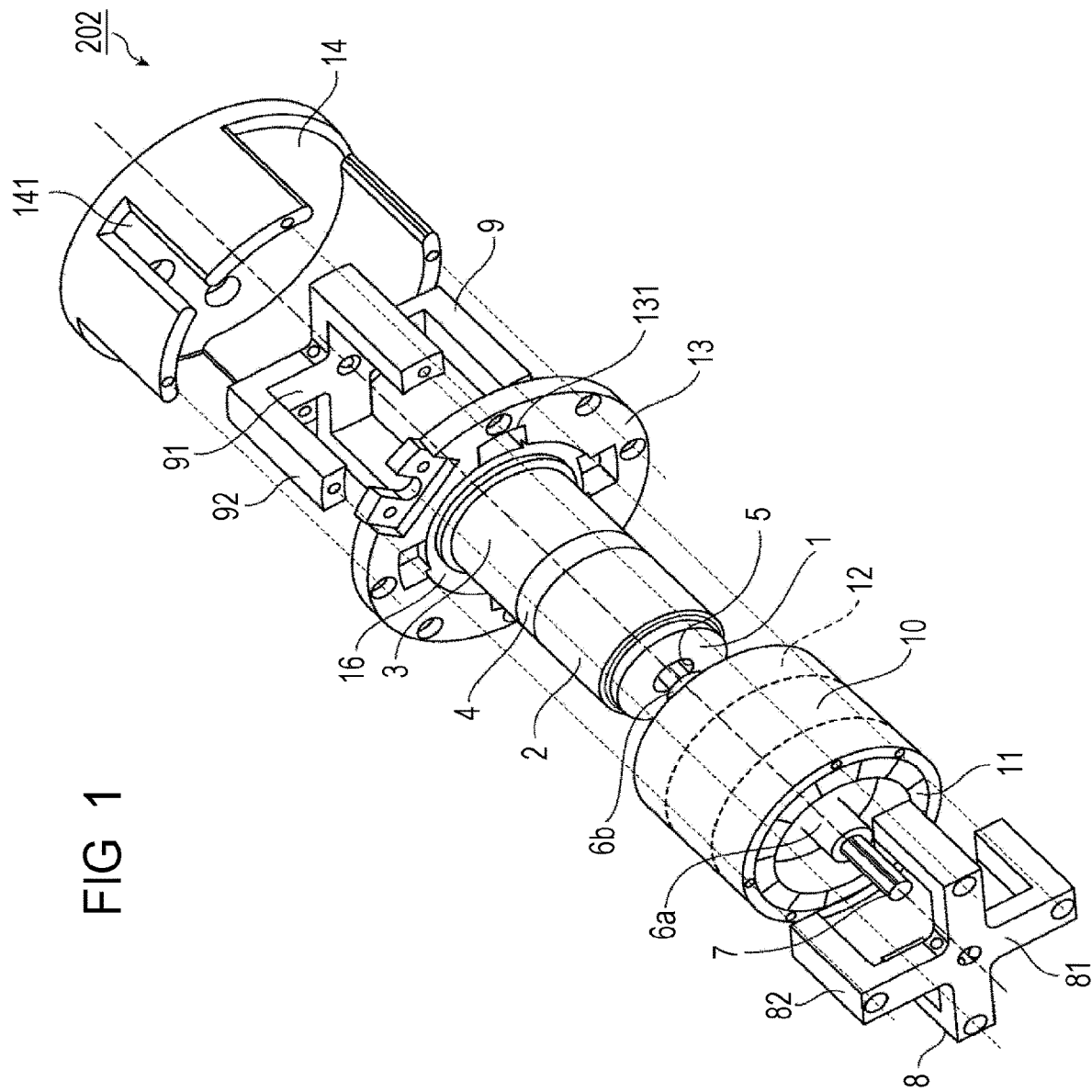
FIG. 1 is an exploded perspective view of an actuator according to a first embodiment of the present invention.
Figure 2:
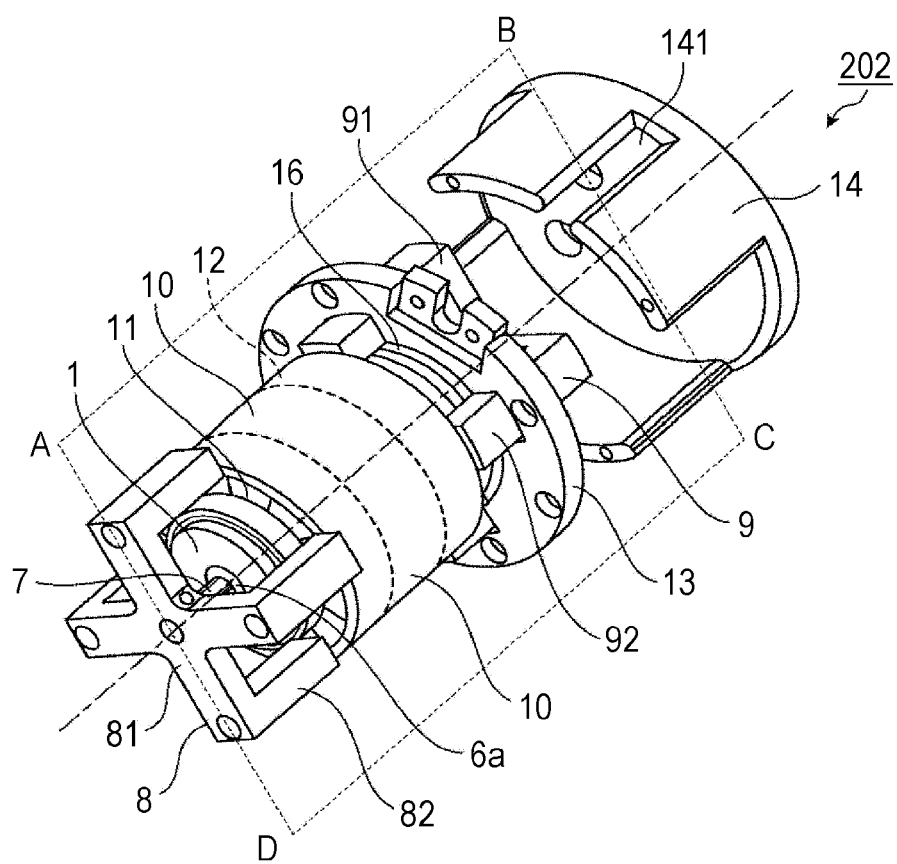
FIG. 2 is a perspective view of the actuator according to the first embodiment of the present invention.
Figure 3:
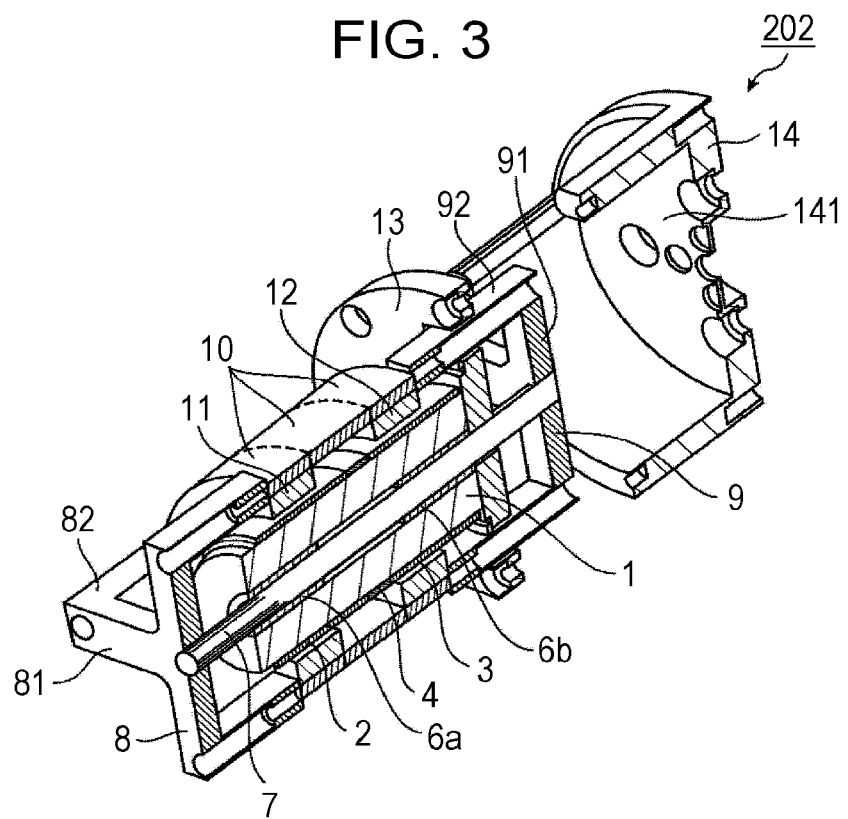
FIG. 3 is a sectional view of the actuator illustrated in FIG. 2, taken along the plane A-B-C-D.
Figure 4:
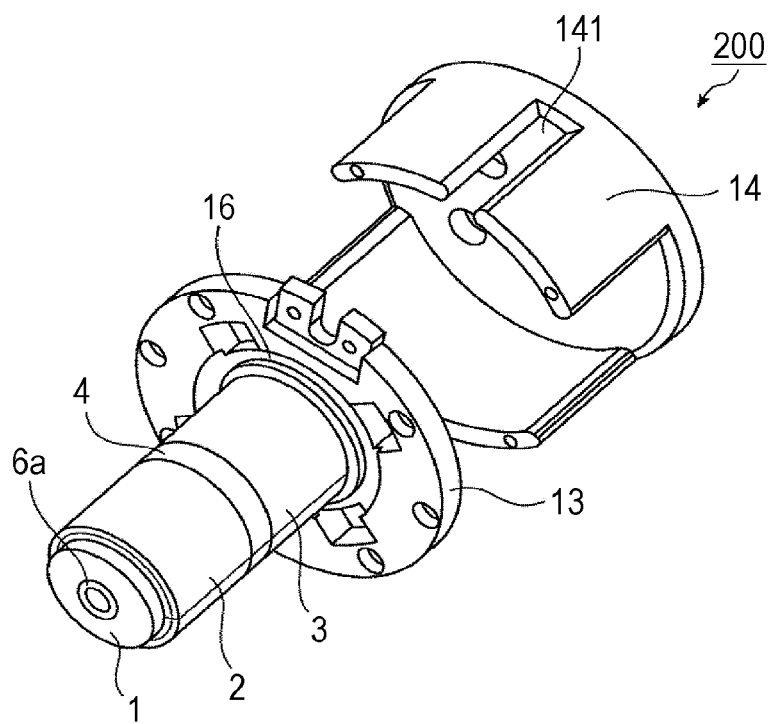
FIG. 4 is a perspective view of a fixed portion according to the first embodiment of the present invention.
Figure 5:
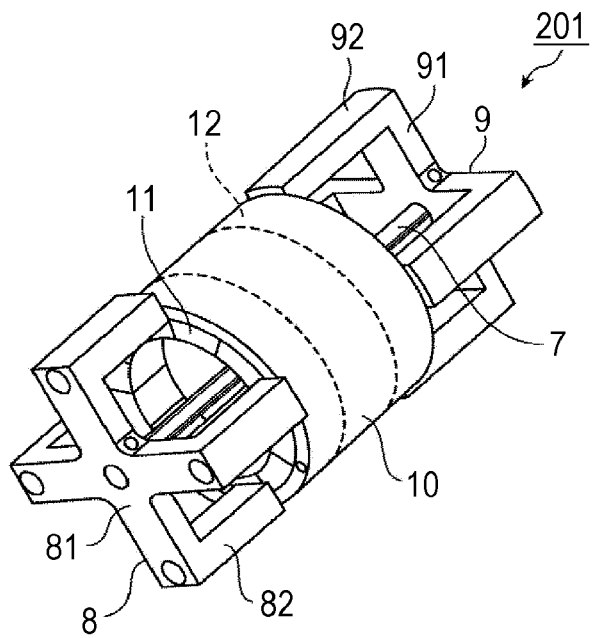
FIG. 5 is a perspective view of a movable portion according to the first embodiment of the present invention.
Figure 6:
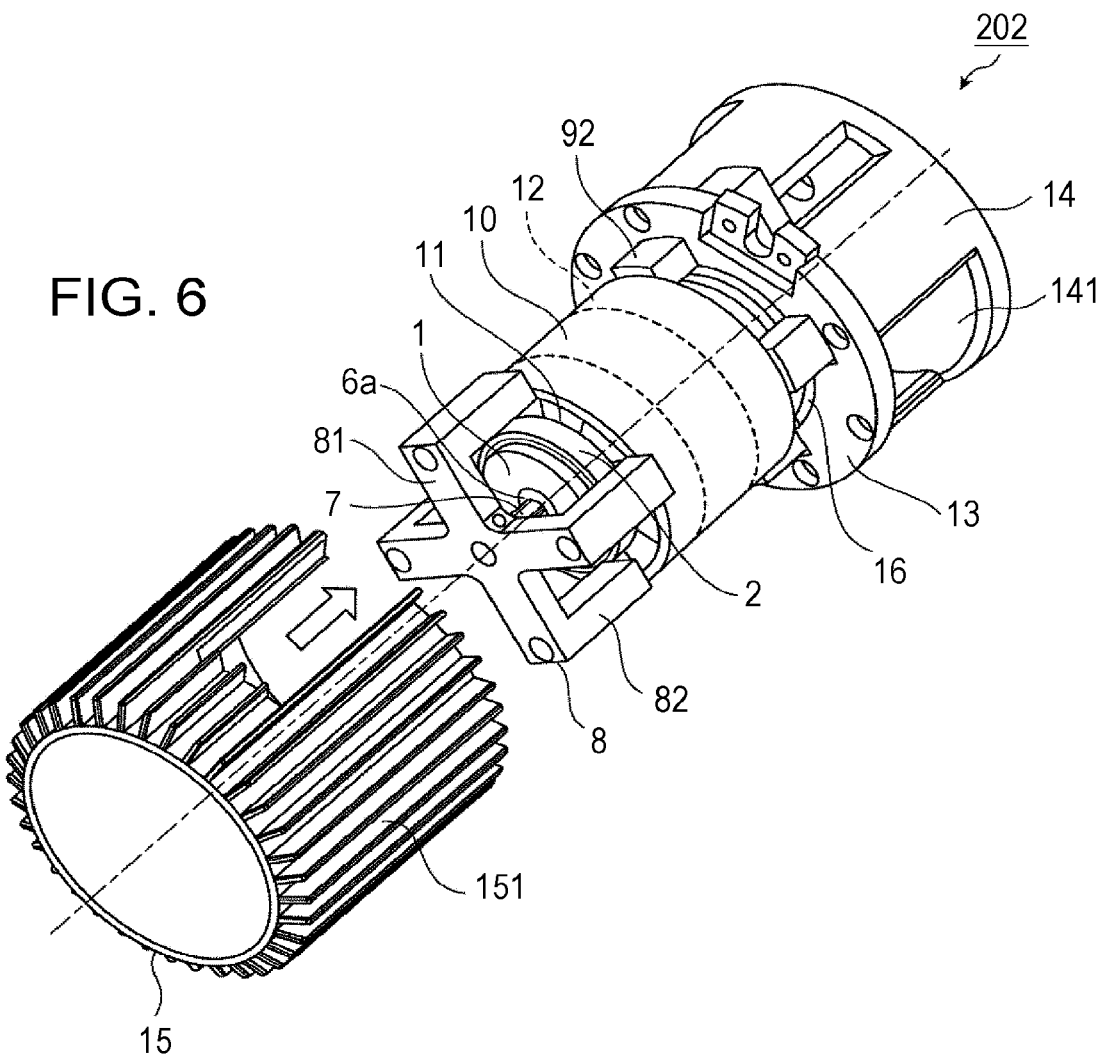
FIG. 6 is a perspective view of the actuator according to the first embodiment of the present invention including a protection cover.
Figure 7:
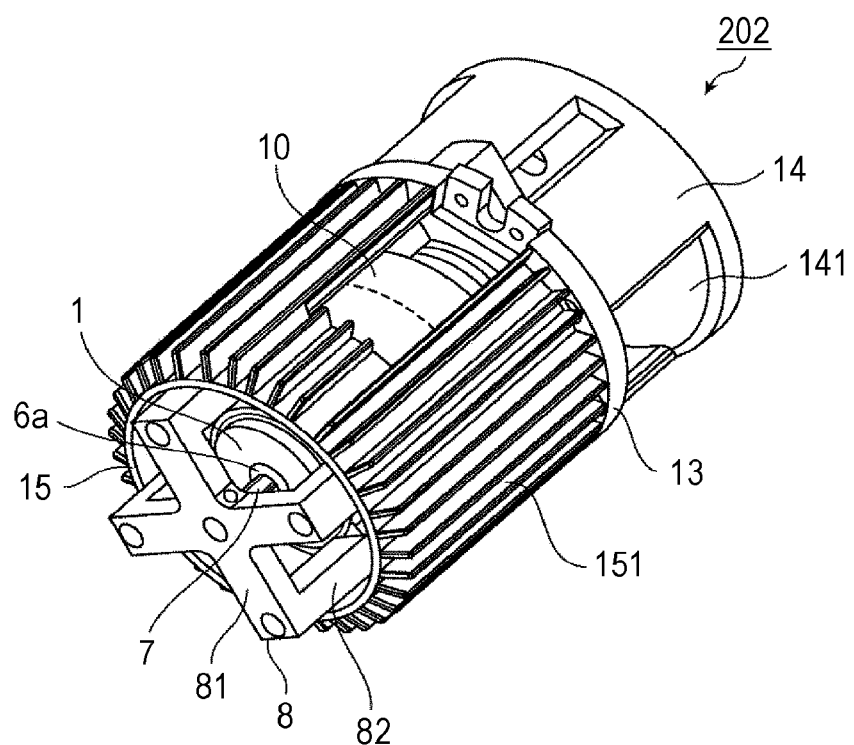
FIG. 7 is a perspective view of the actuator according to the first embodiment of the present invention including the protection cover.

To describe the present invention in detail below, embodiments of the present invention are described with reference to attached drawings.

First Embodiment

An actuator according to the first embodiment of the present invention is described with reference to FIGS. 1 to 7.

Throughout the drawings, the reference numeral 1 refers to a center yoke (inner yoke). The center yoke 1 is a magnetic body having a substantially stick shape.

A first coil 2 and a second coil 3 are wound around the center yoke 1 while being spaced apart from each other. The first coil 2 and the second coil 3 are connected in series or in parallel to a current source, not illustrated, and electric currents flow through the first coil 2 and the second coil 3 in opposite directions.

A third coil 4 is wound around a portion between the first coil 2 and the second coil 3. The third coil 4 is connected to a current source with a switch control unit, not illustrated, interposed between itself and the current source. The direction of electric current flowing through the third coil 4 is switchable independently of the directions of electric currents flowing through the first coil 2 and the second coil 3.

A hollow bearing portion 5 extends along the axis of the center yoke 1. Bearing members 6a and 6b are inserted into both end portions of the bearing portion 5. A shaft 7 thinner than the center yoke 1 is inserted into hollow portions of the bearing members 6a and 6b. The shaft 7 is supported in such a manner as to be linearly movable in the axial direction relative to the center yoke 1 and rotatable or unrotational around the axis.

Here, the bearing members 6a and 6b are, for example, ball bushing bearings when rendered rotatable or spline nuts when rendered unrotational. The center yoke 1 and the shaft 7 are thermally separated from each other by bearings of the bearing members 6a and 6b.

A top bridge (first bridge) 8 is fitted to and fixed to a first end portion of the shaft 7. A bottom bridge (second bridge) 9 is fitted to and fixed to a second end portion of the shaft 7. Each of the top bridge 8 and the bottom bridge 9 includes a substantially cross-shaped body 81 or 91 and four arms 82 or 92 extending from respective distal end portions of the cross-shaped body 81 or 91. The four arms 82 or 92 extend toward the opposing four arms 92 or 82. The shaft 7, the top bridge 8, and the bottom bridge 9 form a support member having an "inner bearing structure".

An outer yoke 10 is fixed between distal end portions of the arms 82 of the top bridge 8 and distal end portions of the arms 92 of the bottom bridge 9. Specifically, the outer yoke 10 is supported in such a manner as to be linearly movable relative to the center yoke 1 and rotatable or unrotational. The outer yoke 10 is formed from a substantially cylindrical magnetic body.

The shape of the bodies 81 and 91 is not limited to a cross shape. The number of the arms 82 or 92 is not limited to four. The top bridge 8 and the bottom bridge 9 may have any other shape with which it supports the outer yoke 10 such that the outer yoke 10 is at least linearly movable.

A first magnet array (magnet) 11 is disposed over the entire inner periphery at a first end portion of the outer yoke 10. The first magnet array 11 is constituted of multiple permanent magnets. The first magnet array 11 faces the first coil 2 while being spaced apart from each other. The first magnet array 11 also faces the third coil 4 depending on the position of the outer yoke 10 after a linear movement.

A second magnet array (magnet) 12 is disposed over the entire inner periphery at a second end portion of the outer yoke 10. The second magnet array 12 is constituted of multiple permanent magnets. The second magnet array 12 faces the second coil 3 while being spaced apart from each other. The second magnet array 12 also faces the third coil 4 depending on the position of the outer yoke 10 after a linear movement.

Here, the first magnet array 11 and the second magnet array 12 have inverted magnetic poles. For example, the first magnet array 11 has the north pole on the surface touching the outer yoke 10 and the south pole on the surface facing the first coil 2 and the third coil 4. On the other hand, the second magnet array 12 has the south pole on the surface touching the outer yoke 10 and the north pole on the surface facing the second coil 3 and the third coil 4.

A flange-shaped base plate 13 is fixed to the first end portion of the center yoke 1. The base plate 13 has four through holes 131 through which the arms 92 of the bottom bridge 9 are slidably inserted.

A closed-end cylindrical attachment jig 14 is fixed to the base plate 13 in such a manner as to cover the bottom bridge 9. A bottom portion 141 of the attachment jig 14 is attachable to an external device, such as a distal end portion of a robot that assembles components.

A substantially cylindrical protection cover 15 is attached to the base plate 13 in such a manner as to cover the peripheries of the center yoke 1 and the outer yoke 10. The inner periphery of the protection cover 15 is spaced apart from the center yoke 1, the outer yoke 10, the top bridge 8, and the bottom bridge 9. The protection cover 15 includes multiple radiation fins 151 on the outer periphery of the protection cover 15. The attachment jig 14 and the protection cover 15 form a heat radiation member.

The base plate 13 includes a ring-shaped magnetic plate 16. The magnetic plate 16 faces the second magnet array 12. The magnetic plate 16 functions as a "magnetic clamp" that holds with magnetic force (attraction) the second magnet array 12 that has touched the base plate 13 as a result of a linear movement of the outer yoke 10.

The center yoke 1, the first coil 2, the second coil 3, the third coil 4, the bearing members 6a and 6b, the base plate 13, the attachment jig 14, the protection cover 15, and the magnetic plate 16 form a fixed portion 200. The shaft 7, the top bridge 8, the bottom bridge 9, the outer yoke 10, the first magnet array 11, and the second magnet array 12 form a movable portion 201. The fixed portion 200 and the movable portion 201 form an actuator 202.

Figure 8:
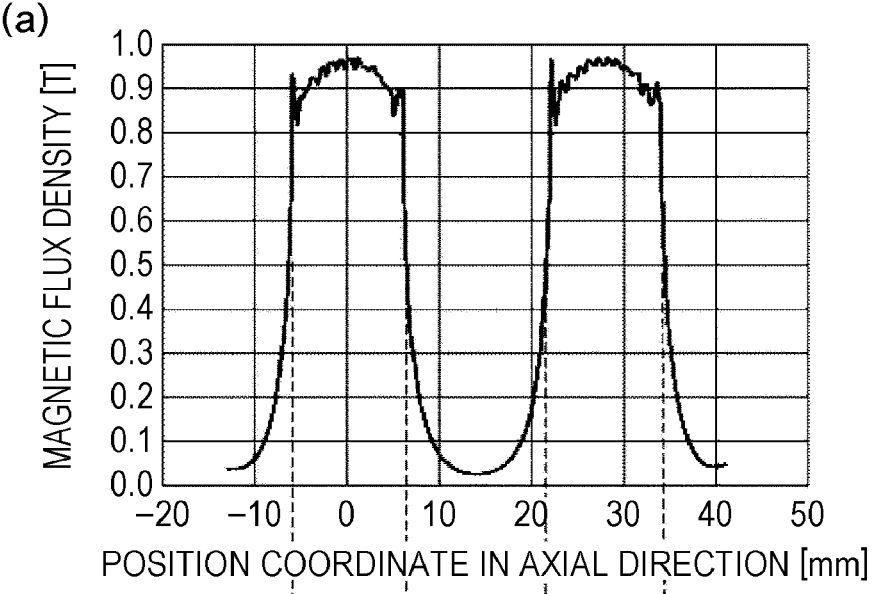
FIG. 8(a) is a graph of the magnetic flux density with respect to the position coordinate of the actuator according to the first embodiment of the present invention in the axial direction.
FIG. 8(b) illustrates a distribution of the magnetic flux density of the actuator according to the first embodiment of the present invention.
Figure 8:
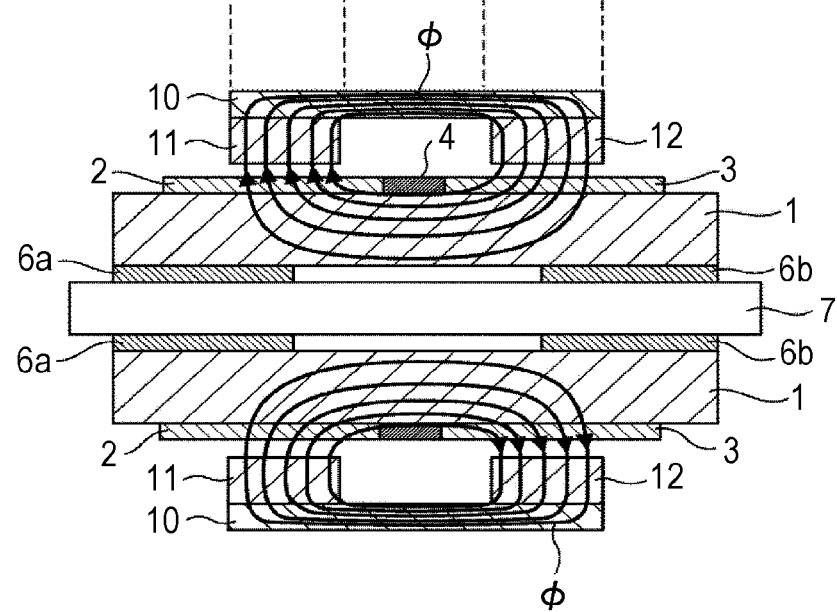

Now, the distribution of the magnetic flux density of the actuator 202 is described with reference to FIG. 8.

FIG. 8(a) is a graph of the magnetic flux density of the first magnet array 11 and the second magnet array 12 with respect to the position coordinate of the movable portion 201 in the axial direction. FIG. 8(b) illustrates magnetic flux φ produced by the first magnet array 11 and the second magnet array 12 in a section of the actuator 202 taken along the surface A-B-C-D of FIG. 2.

As illustrated in FIG. 8(b), the magnetic flux ϕ produced by the first magnet array 11 and the second magnet array 12 is looped magnetic flux that passes the entire periphery of the outer yoke 10 and the inside of the center yoke 1.

A typical voice coil motor separately includes, besides the center yoke 1 and the outer yoke 10, a yoke (that is, a "return yoke") that turns the magnetic flux to form looped magnetic flux. Although having a structure including two motors connected in series, the actuator 202 according to the first embodiment can dispense with a return yoke because the center yoke 1 and the outer yoke 10 turn the magnetic flux. This structure allows size reduction of the actuator 202.

Disposing the first magnet array 11 and the second magnet array 12 over the entire periphery at both end portions of the outer yoke 10 renders the entire periphery of the outer yoke 10 to be usable as a magnetic circuit and reduces the magnetic resistance. The actuator 202 having this structure can thus reduce the thickness of the outer yoke 10 and have a smaller weight.

A center portion of the center yoke 1 has low magnetic flux density and thus has a low function of forming the magnetic circuit. Disposing the hollow bearing portion 5 at the axis of the center yoke 1 thus does not significantly reduce the efficiency of the actuator 202. The actuator 202 having an inner bearing structure constituted of the shaft 7, the top bridge 8, and the bottom bridge 9 can thus have a smaller size than an existing linear motor having an outer bearing structure constituted of a fixing base and a slider without reducing the efficiency.

Figure 9:
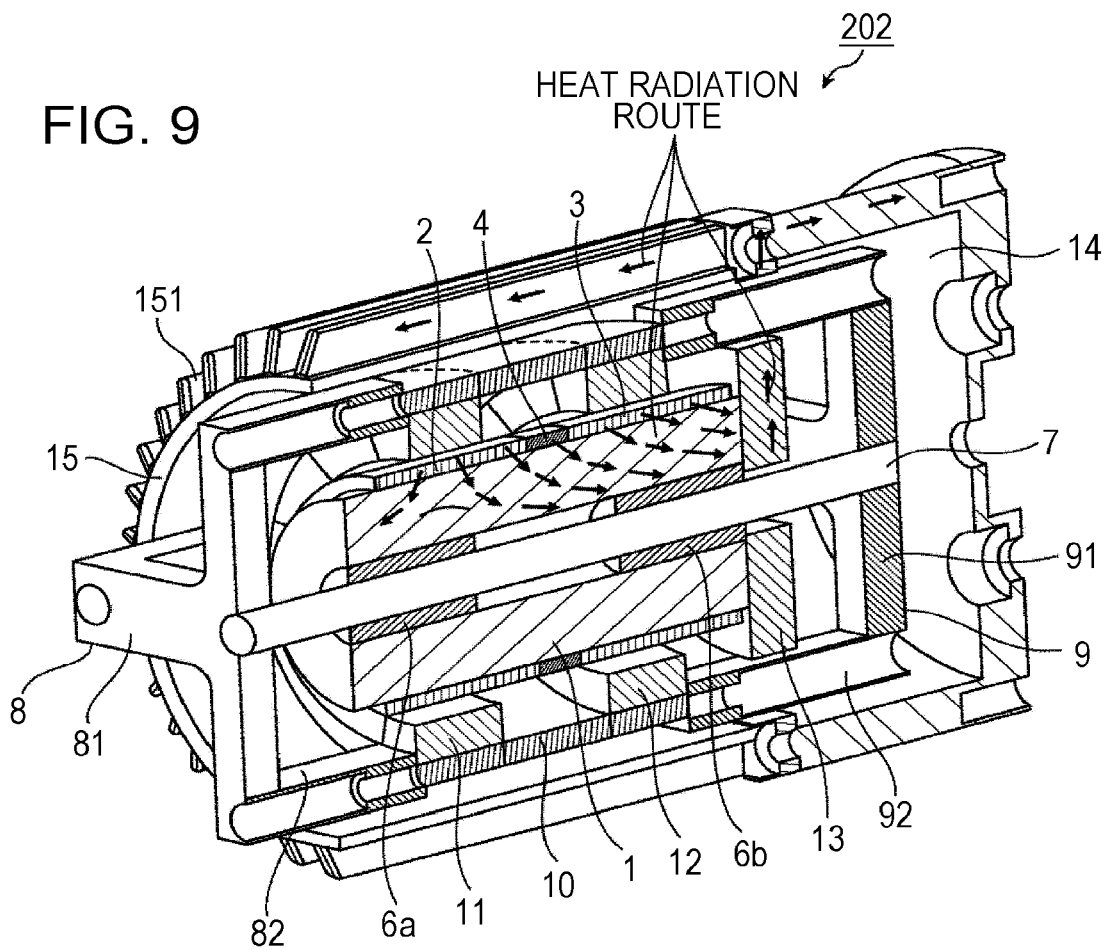
FIG. 9 illustrates a heat radiation route of the actuator according to the first embodiment of the present invention.

Now, a heat radiation operation of the actuator 202 is described with reference to FIG. 9.

A current source, not illustrated, feeds electric currents to the first coil 2, the second coil 3, and the third coil 4, so that the movable portion 201 moves linearly relative to the fixed portion 200. In accordance with the currents that flow, the first coil 2, the second coil 3, and the third coil 4 produce heat due to copper loss.

When the electric currents are fed to the first coil 2, the second coil 3, and the third coil 4 so as to produce an alternating field, the yokes also produce heat due to iron loss.

When a linear motor is used without frequently repeating acceleration and deceleration, copper loss is dominant over iron loss and the produced heat is transferred to the center yoke 1.

Here, the center yoke 1 and the shaft 7 are thermally separated from each other by the bearings of the bearing members 6a and 6b. Specifically, the fixed portion 200 around which the first coil 2, the second coil 3, and the third coil 4 are wound is thermally separated from the movable portion 201 on which an end effector, not illustrated, is disposed. Thus, components such as an end effector disposed on the actuator movable portion can be prevented from being heated to high temperatures.

The center yoke 1 has heat capacity large enough to allow for heat produced by the first coil 2, the second coil 3, and the third coil 4. Thus, the temperature of the center yoke 1 does not rapidly rise within a short period unlike in the actuator disclosed in PLT 1 including a coil disposed in a bobbin having small heat capacity, which serves as a movable portion.

The actuator disclosed in PTL 1 includes a coil, serving as a heat production source, directly disposed in the movable portion. Thus, natural air cooling using an end effector is the only way of forming a heat radiation route unless a forced air cooling mechanism is used.

In the actuator of the present application, on the other hand, heat transferred from the first coil 2, the second coil 3, and the third coil 4 to the center yoke 1 is transferred through the base plate 13 to the attachment jig 14 and the protection cover 15, which have smaller thermal resistance. This structure restricts the upper limit of the temperature rise of the actuator 202 to a lowest possible temperature and can prolong the time until which the temperature reaches the upper limit, that is, increase the thermal time constant.

Now, a magnetic clamp operation of the magnetic plate 16 is described with reference to FIG. 10.

Figure 10:
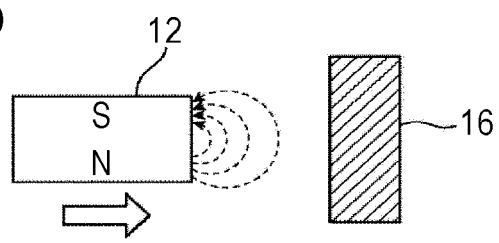
FIG. 10 illustrates an operation of a magnetic clamp of the actuator according to the first embodiment of the present invention.
Figure 10:
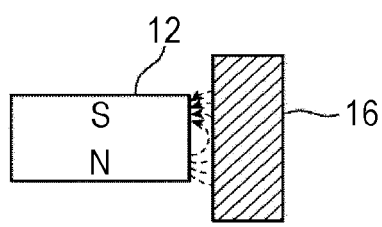

As illustrated in FIG. 10, when the movable portion 201 moves linearly and the second magnet array 12 approaches the opposing ring-shaped magnetic plate 16 disposed on the base plate 13, the second magnet array 12 is attracted by the magnetic plate 16 due to the magnetic flux leaking from the side portion of the second magnet array 12. When the second magnet array 12 touches the magnetic plate 16, the magnetic plate 16 keeps the second magnet array 12 in contact with itself with the magnetic force.

An existing actuator that does not include the magnetic plate 16 keeps the outer yoke 10 in contact with the base plate 13 (that is, keeps the movable portion 201 at an end point adjacent to the base plate 13) by continuously flowing an electric current to the coil. A coil in the actuator having this structure produces a large amount of heat when, for example, the actuator faces downward and an end effector grasps a heavy workpiece.

On the other hand, the actuator 202 according to the first embodiment keeps the outer yoke 10 in contact with the base plate 13 with the magnetic force (attraction) between the magnetic plate 16 and the second magnet array 12. Thus, the actuator 202 can reduce or eliminate electric currents fed to the first coil 2, the second coil 3, and the third coil 4, so that it can reduce an amount of heat produced by the first coil 2, the second coil 3, and the third coil 4.

In order for the second magnet array 12 to cease being in contact with and being held by the magnetic plate 16 with the magnetic force, a maximum electric current is fed for a short period of time.

This feeding detaches the second magnet array 12 from the magnetic plate 16 in a shortest period of time.

Here, the attraction between the second magnet array 12 and the magnetic plate 16 is in inverse proportion to the distance between themselves and decreases at an increasing rate. When a position sensor, not illustrated, monitors the distance between the second magnet array 12 and the magnetic plate 16 and finds that the second magnet array 12 and the magnetic plate 16 have moved away from each other to positions at which the effect of attraction is ignorable (approximately 1 mm), the mode is switched to a control mode.

As described above, the actuator 202 according to the first embodiment includes the stick-shaped center yoke 1 inserted into the cylindrical outer yoke 10, the support member that supports the outer yoke 10 such that the outer yoke 10 is linearly movable in the axial direction of the center yoke 1, the first coil 2, the second coil 3, and the third coil 4 wound around the center yoke 1, the first magnet array 11 and the second magnet array 12 disposed on the inner periphery of the outer yoke 10 in such a manner as to face the first coil 2, the second coil 3, and the third coil 4, the flat base plate 13 at the first end portion of the center yoke 1, and the heat radiation member touching the base plate 13. The inner bearing structure thus can achieve the highly efficient small actuator 202 and restrict the temperature rise of the actuator 202.

The actuator 202 also includes the bearing members 6a and 6b interposed between the bearing portion 5 and the shaft 7. The bearings of the bearing members 6a and 6b thermally separate the bearing portion 5 and the shaft 7 from each other. This structure can prevent an end effector from being heated to high temperatures.

The actuator 202 also includes the protection cover 15 that covers the peripheries of the center yoke 1 and the outer yoke 10 for use as a heat radiation member. The protection cover 15 includes the multiple radiation fins 151 on its outer periphery. This structure can prevent heat that has been transferred from the center yoke 1 to the base plate 13 from being transferred to an external device such as a robot through the attachment jig 14.

The base plate 13 includes the magnetic plate 16 disposed in such a manner as to face the second magnet array 12. Since the magnetic plate 16 serves as a magnetic clamp, this structure can reduce electric currents fed to the first coil 2, the second coil 3, and the third coil 4 and the amount of heat produced by the first coil 2, the second coil 3, and the third coil 4.

The support member supports the outer yoke 10 such that the outer yoke 10 is rotatable around the axis of the center yoke 1. The actuator 202 having this structure can thus have a small size and two degrees of freedom.

Second Embodiment

Figure 11:
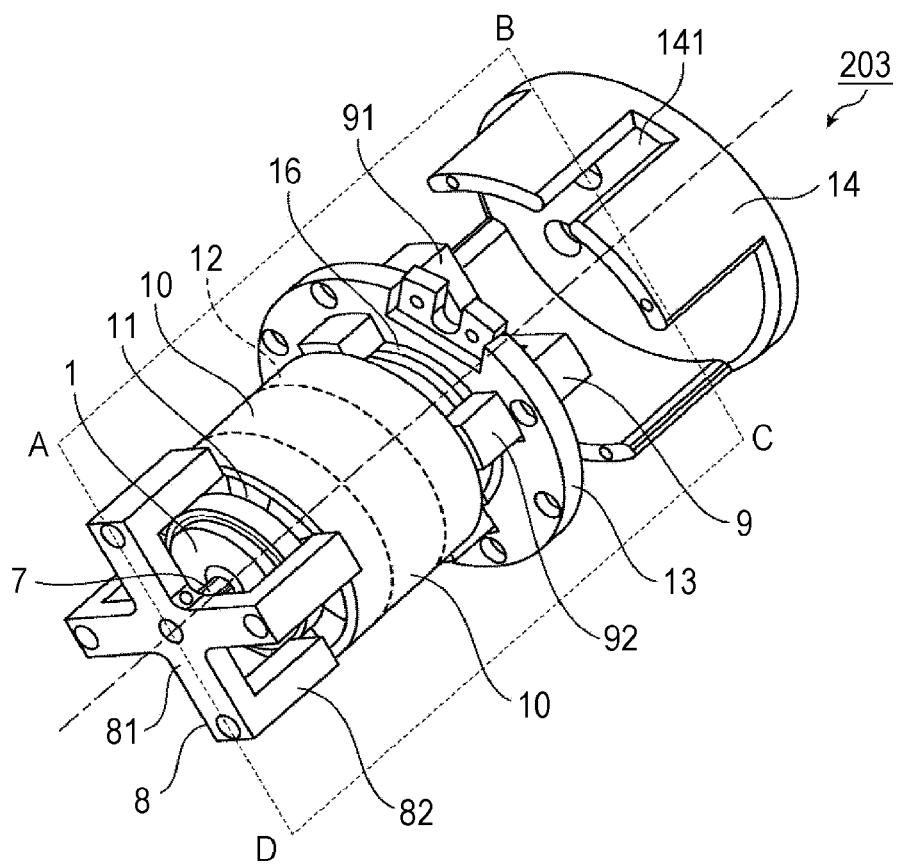
FIG. 11 is a perspective view of an actuator according to a second embodiment of the present invention.
Figure 12:
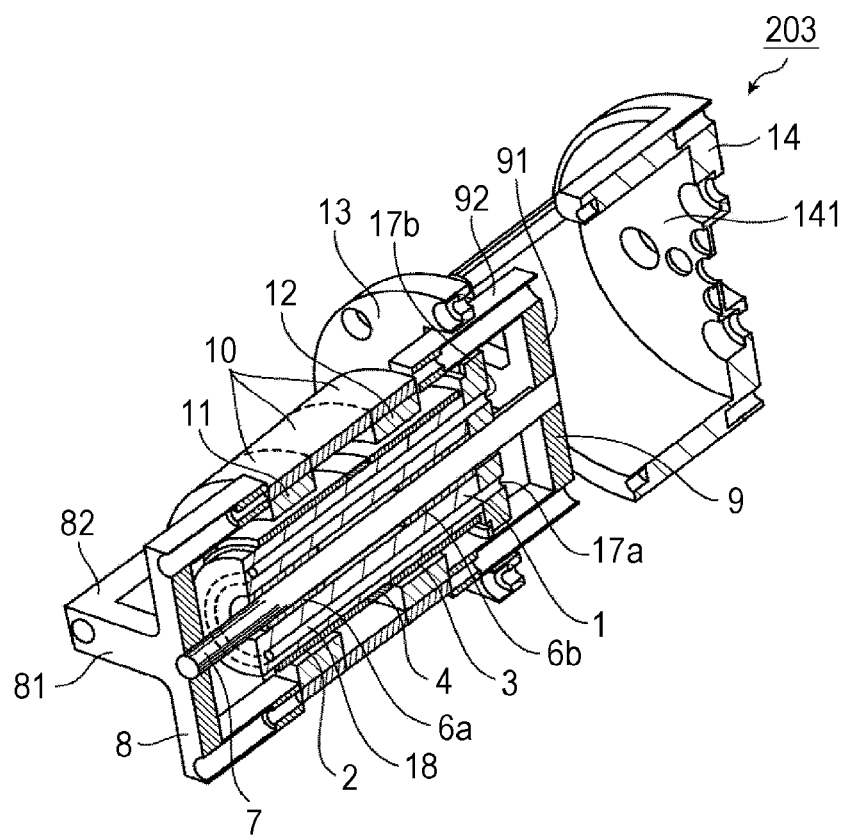
FIG. 12 is a sectional view of the actuator illustrated in FIG. 11 taken along the plane A-B-C-D.
Figure 13:
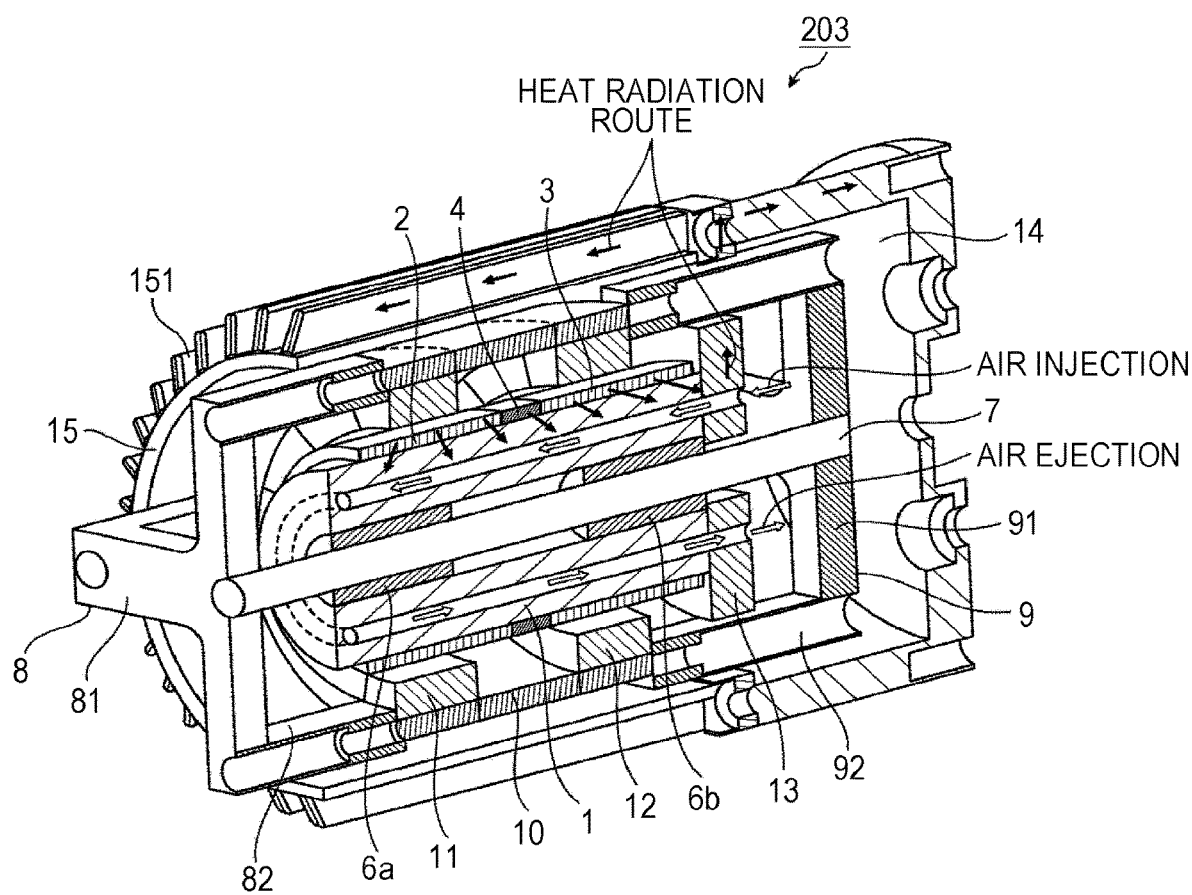
FIG. 13 illustrates a heat radiation route and a cooling operation of the actuator according to a second embodiment of the present invention.

An actuator having an air-cooling or coolant hole is described with reference to FIGS. 11 to 13. Components the same as those of the actuator 202 according to the first embodiment illustrated in FIGS. 1 to 7 are denoted with the same reference numerals and not described.

The base plate 13 has multiple through holes 17a and 17b near the shaft 7. The center yoke 1 has a hole 18 connecting with the through holes 17a and 17b. The hole 18 connects the through holes 17a and 17b together and extends along and beside the bearing portion 5 to allow air or a coolant to flow through itself. An actuator 203 has the above-described structure.

Now, a cooling operation of the actuator 203 is described with reference to FIG. 13.

First, air or a coolant is injected into the through hole 17a of the base plate 13. The air or the coolant flows through the hole 18 of the center yoke 1 and is ejected from the through hole 17b. Thus, the center yoke 1 is forcibly cooled.

As described in the first embodiment, a center portion of the center yoke 1 has low magnetic flux density and thus has a low function of forming the magnetic circuit. Thus, providing the hole 18 along and beside the axis of the center yoke 1 does not significantly reduce the operation efficiency of the actuator 202.

The heat produced by the first coil 2, the second coil 3, and the third coil 4 and left without being cooled by the center yoke 1 is transferred through the base plate 13 to the attachment jig 14 and the protection cover 15. This structure restricts the temperature rise of the actuator 202 and prevents an end effector from being heated to high temperatures.

As described above, in the actuator 202 according to the second embodiment, the center yoke 1 has the air-cooling or coolant hole 18 extending along and beside the bearing portion 5. Injecting and ejecting air or a coolant from the through holes 17a and 17b of the base plate 13 more efficiently restricts the temperature rise of the actuator 202 without reducing the operation efficiency of the actuator 202 and prevents an end effector from being heated to high temperatures.

Embodiments of the present invention can be freely combined within the scope of the invention or any of the components of each embodiment may be modified or omitted.

INDUSTRIAL APPLICABILITY

An actuator in the present invention is usable by being attached to a device such as a robot that assembles components.

REFERENCE SIGNS LIST 1 center yoke (inner yoke)
2 first coil
3 second coil
4 third coil
5 bearing portion
6a, 6b bearing member
7 shaft
8 top bridge (first bridge)
9 bottom bridge (second bridge)
10 outer yoke
11 first magnet array (magnet)
12 second magnet array (magnet)
13 base plate
14 attachment jig
15 protection cover
16 magnetic plate
17a, 17b through hole
18 hole
81 body
82 arm
91 body
92 arm
131 through hole
141 bottom portion
151 radiation fin
200 fixed portion
201 movable portion
202, 203 actuator

The invention claimed is:
1. An actuator, comprising:
a stick-shaped inner yoke inserted through a cylindrical outer yoke;
a support member that supports the outer yoke such that the outer yoke is linearly movable in an axial direction of the inner yoke;
a coil wound around the inner yoke;
a magnet disposed on an inner periphery of the outer yoke in such a manner as to face the coil;
a flat base plate disposed at a first end portion of the inner yoke; and
a heat radiation member directly touching the base plate and extending beyond the base plate in the axial direction away from the first end portion of the inner yoke so that the inner yoke, the base plate, and the heat radiation member are arranged in that order in the axial direction.

2. The actuator according to claim 1, further comprising:
a hollow bearing portion extending along an axis of the inner yoke,
wherein the support member includes
a shaft inserted through the bearing portion and supported in such a manner as to be linearly movable relative to the inner yoke, a first bridge fitted to a first end portion of the shaft and touching a first end portion of the outer yoke, and a second bridge fitted to a second end portion of the shaft and touching a second end portion of the outer yoke.

3. The actuator according to claim 2, further comprising a bearing interposed between the bearing portion and the shaft.

4. The actuator according to claim 2, wherein the inner yoke has a hole extending along and beside the bearing portion, the hole allowing cooling air or a coolant to flow therethrough.

5. The actuator according to claim 1, wherein the heat radiation member is a protection cover that covers peripheries of the inner yoke and the outer yoke.

6. The actuator according to claim 5, wherein the protection cover is cylindrical, wherein an inner periphery of the protection cover is spaced apart from the inner yoke and the outer yoke, and wherein the protection cover includes a plurality of radiation fins on an outer periphery of the protection cover.

7. The actuator according to claim 1, wherein the heat radiation member is an attachment jig that is attachable to an external device.

8. The actuator according to claim 7, wherein the attachment jig is attachable to a robot that assembles components.

9. The actuator according to claim 1, wherein the base plate includes a magnetic plate disposed in such a manner as to face the magnet.

10. The actuator according to claim 9, wherein the magnet is disposed over an entirety of the inner periphery of the outer yoke, and wherein the magnetic plate has a ring shape.

11. The actuator according to claim 1, wherein the support member supports the outer yoke such that the outer yoke is rotatable around an axis of the inner yoke.

* * * * *